(12) United States Patent
Putnam

(10) Patent No.: US 6,854,932 B2
(45) Date of Patent: *Feb. 15, 2005

(54) CABLE PULLING APPARATUS

(76) Inventor: Samuel W. Putnam, 305 Darbonne Dr., West Monroe, LA (US) 71291

( * ) Notice: Subject to any disclaimer, the term of this patent is extended or adjusted under 35 U.S.C. 154(b) by 88 days.

This patent is subject to a terminal disclaimer.

(21) Appl. No.: 10/021,587

(22) Filed: Dec. 12, 2001

(65) Prior Publication Data

US 2002/0081155 A1 Jun. 27, 2002

Related U.S. Application Data

(60) Provisional application No. 60/257,236, filed on Dec. 22, 2000.

(51) Int. Cl.[7] .............................. F16L 1/028; B66F 1/00
(52) U.S. Cl. ................. 405/184.3; 405/184; 405/154.1; 254/31; 254/107
(58) Field of Search ............................. 405/154.1, 184, 405/184.1, 184.3; 254/29 R, 106, 30, 31, 107

(56) References Cited

U.S. PATENT DOCUMENTS

| 2,044,483 | A | | 6/1936 | Neher ......................... 254/71 |
| 2,126,933 | A | | 8/1938 | Stone et al. .................... 255/1 |
| 2,889,135 | A | | 6/1959 | Tennyck ....................... 254/29 |
| 2,939,739 | A | | 6/1960 | Grunsky ....................... 294/96 |
| 3,094,312 | A | | 6/1963 | Woolgar ....................... 254/29 |
| 3,266,776 | A | | 8/1966 | Catu .......................... 254/135 |
| 3,747,675 | A | * | 7/1973 | Brown ........................ 166/237 |
| 3,787,950 | A | | 1/1974 | Bagby ......................... 29/237 |
| 3,834,668 | A | | 9/1974 | Casey .......................... 254/29 |
| 3,998,428 | A | | 12/1976 | Miles .......................... 254/29 |
| 4,030,183 | A | | 6/1977 | Smola ......................... 29/252 |
| 4,268,190 | A | * | 5/1981 | Tesson ...................... 405/184.1 |
| 4,318,835 | A | | 3/1982 | Clarke ......................... 264/36 |
| RE31,206 | E | * | 4/1983 | Ahlgren ....................... 254/106 |
| 4,448,393 | A | | 5/1984 | Habegger et al. ........... 254/264 |
| 4,456,226 | A | | 6/1984 | Stumpmeier ................. 254/264 |
| 4,457,647 | A | | 7/1984 | Dusette et al. .............. 405/154 |
| 4,571,802 | A | | 2/1986 | Calhoun ................ 29/157.3 R |
| 4,593,884 | A | | 6/1986 | Zschocke et al. ........... 254/264 |
| 4,604,938 | A | * | 8/1986 | Kennedy et al. .............. 89/1.8 |
| 4,615,509 | A | | 10/1986 | Biass ......................... 254/264 |
| 4,634,101 | A | | 1/1987 | Lauber ....................... 254/228 |
| 4,634,313 | A | | 1/1987 | Robbins ..................... 405/184 |
| 4,648,746 | A | | 3/1987 | Abinett ....................... 405/184 |
| 4,685,831 | A | | 8/1987 | Mahoney .................... 405/156 |
| 4,693,404 | A | | 9/1987 | Wayman et al. ............ 225/103 |
| 4,732,222 | A | | 3/1988 | Schmidt ....................... 175/22 |
| 4,738,565 | A | | 4/1988 | Streatfield et al. .......... 405/154 |
| 5,013,188 | A | | 5/1991 | Campbell et al. ........... 405/184 |
| 5,112,070 | A | | 5/1992 | Hahn ......................... 280/79.4 |
| 5,127,481 | A | | 7/1992 | Hesse ......................... 175/295 |
| 5,171,106 | A | | 12/1992 | Rockower et al. .......... 405/156 |
| 5,173,009 | A | | 12/1992 | Moriarty ..................... 405/154 |
| 5,192,165 | A | | 3/1993 | Torielli ....................... 405/156 |
| 5,205,671 | A | | 4/1993 | Handford .................... 405/154 |
| 5,207,533 | A | | 5/1993 | Federspiel et al. .......... 405/156 |
| 5,208,967 | A | | 5/1993 | Beard ........................... 29/726 |
| 5,277,406 | A | | 1/1994 | Knight ........................ 254/228 |
| 5,302,053 | A | | 4/1994 | Moriarty ..................... 405/154 |
| 5,306,101 | A | | 4/1994 | Rockower et al. .......... 405/154 |
| 5,328,297 | A | | 7/1994 | Handford .................... 405/184 |

(List continued on next page.)

FOREIGN PATENT DOCUMENTS

WO WO98/30350 * 7/1998

Primary Examiner—Sunil Singh
(74) Attorney, Agent, or Firm—John M. Harrison

(57) ABSTRACT

A cable pulling apparatus for pulling a work load attached to a cable, including at least one cable-pulling device for engaging the cable. The cable-pulling device or devices each includes at least one cable-pulling member fitted with a cable-gripping element for pulling the cable and the workload.

18 Claims, 10 Drawing Sheets

U.S. PATENT DOCUMENTS

| | | | |
|---|---|---|---|
| 5,403,122 A | 4/1995 | Granella | 405/184 |
| 5,482,404 A | 1/1996 | Tenbusch, II | 405/184 |
| 5,580,188 A | 12/1996 | Nowak | 405/184 |
| 5,642,912 A | 7/1997 | Parish, II | 294/86.12 |
| 5,709,503 A | 1/1998 | Manlow | 405/154 |
| 5,749,677 A | 5/1998 | Grigoraschenko et al. | 405/184 |
| 5,782,311 A | 7/1998 | Wentworth | 175/53 |
| 5,785,458 A | 7/1998 | Handford | 405/184 |
| 6,092,553 A | 7/2000 | Hodgson | 138/97 |
| 6,109,832 A | 8/2000 | Lincoln | 405/184 |
| 6,129,486 A | 10/2000 | Putnam | 405/184 |
| 6,244,783 B1 | 6/2001 | Puttmann et al. | 405/184 |
| 6,357,967 B1 * | 3/2002 | Putnam | 405/184.3 |

* cited by examiner

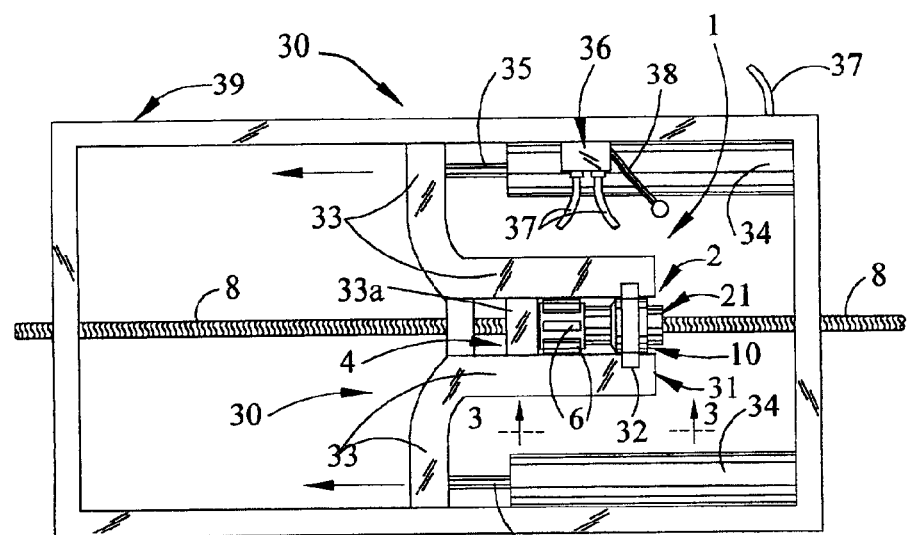
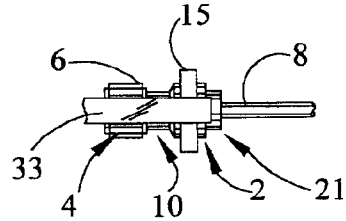
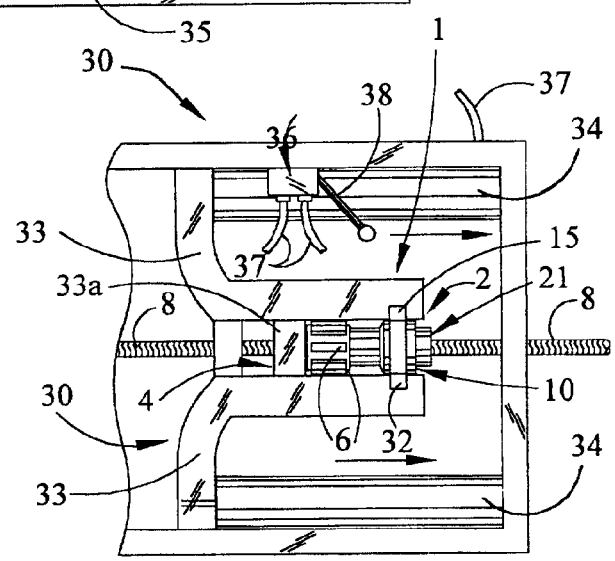
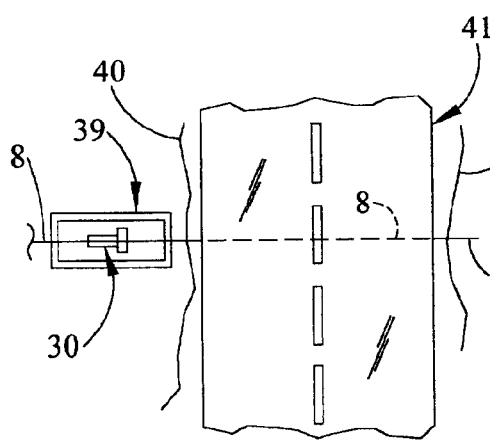
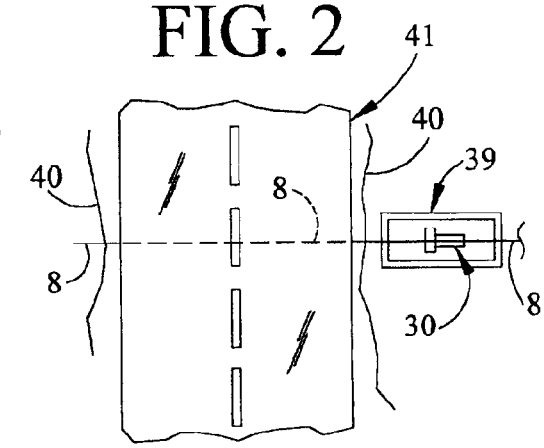
FIG. 1A
FIG. 3
FIG. 2
FIG. 4
FIG. 5

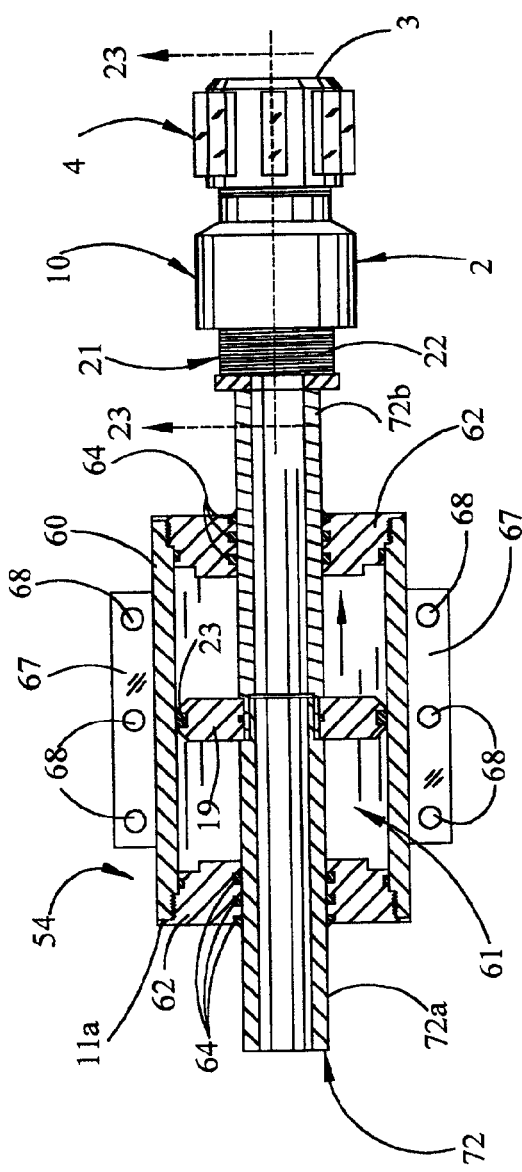
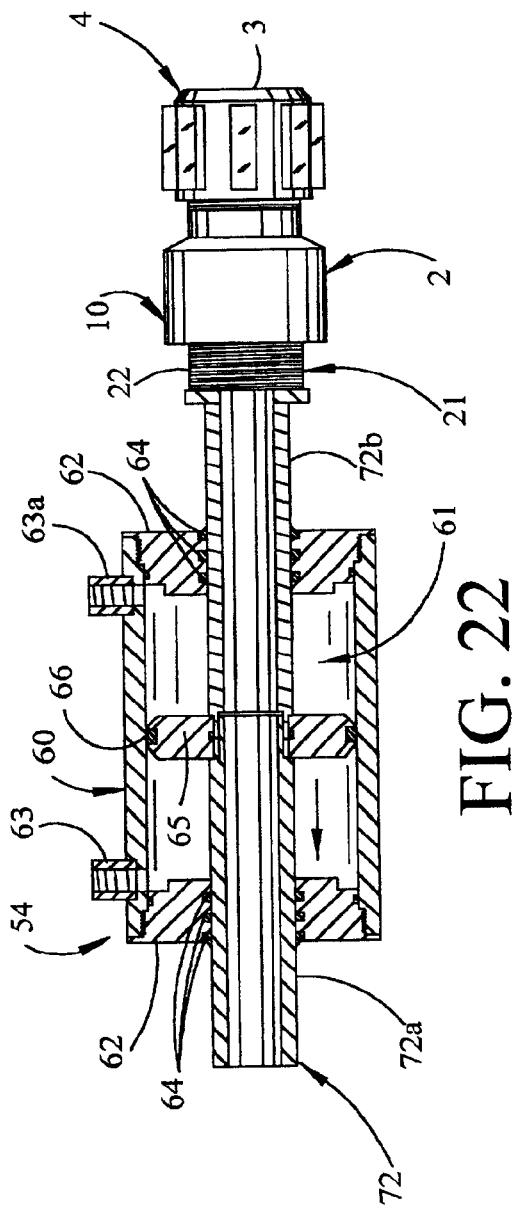
FIG. 21
FIG. 22

US 6,854,932 B2

CABLE PULLING APPARATUS

CROSS-REFERENCE TO RELATED APPLICATIONS

This application claims the benefit of U.S. Provisional Application Ser. No. 60/257,236, Filed Dec. 22, 2000.

BACKGROUND OF THE INVENTION

FIELD OF THE INVENTION

This invention relates to the pulling of cable under load, typically in pipe bursting or breaking and/or pulling operations beneath a barrier such as a road, railroad track, pipeline or the like, when trenching is not feasible and more particularly, to a cable-pulling apparatus and method of operation. It has surprisingly been found that the apparatus described and claimed in my U.S. Pat. No. 6,129,486, which issued on Oct. 10, 2000, can be adapted from pulling and pushing rods, to pulling cable. The problem encountered in direct application of the rod gripping mechanism described in the patent is damage to the cable by the teeth in the spring-loaded wedge element. This problem was solved by carefully choosing the length and internal bore of one or more sets of wedge segments in proportion to the cable diameter and, in preferred circumstances, using a pair of in-line cable gripping and pulling devices. The cable-pulling apparatus typically includes at least one and preferably two, spring-loaded wedges sized for receiving a cable of proportional diameter to be deployed and pulled. The wedge segments selectively engage and release the cable without significant cable damage, responsive to operation of one or more cable-pulling apparatus. A single spring-loaded wedge cable-gripping device can be utilized in association with a winch for keeping the cable taut during each successive cable pulling and gripping sequence. Each cable-pulling apparatus is typically hydraulically operated to incrementally advance the cable using the spring-operated wedge or wedges in any pulling operation under load, and typically where the load must be deployed through the terrain beneath a barrier, responsive to engagement and release of the wedge segments with the cable inside the spring-operated wedge housing.

One of the problems realized in the laying of pipelines and piping of relatively small diameter is that of access under barriers such as highways, railroad tracks, existing pipelines, runways and the like, where trenching is not feasible or practical. Various apparatus have been designed to effect extension of cables, pipe or rods through such terrain beneath these barriers. Patents of interest in this regard include U.S. Pat. Nos. 2,939,739; 3,787,950; 4,030,183; 5,112,020; 4,571,802; 3,094,312; and 2,889,135.

It is an object of this invention to provide a new and improved cable-pulling apparatus for pulling a cable and an attached work load, typically over the terrain or through the terrain beneath a barrier.

Another object of the invention is to provide a new and improved cable-pulling apparatus which may be characterized by a spring-loaded wedge device or devices that may be positioned in one or more cable-pulling apparatus to sequentially and incrementally pull the cable and a work load such as a pipe-bursting tool and/or a pipe or pipes over or through the terrain, typically beneath a barrier, responsive to operation of the cable-pulling apparatus.

Still another object of the invention is to provide a cable pulling apparatus for pulling a work load attached to a cable, including at least one cable-pulling device for engaging the cable, which cable-pulling device each includes at least one cable-pulling member fitted with a cable-gripping element for pulling the cable and the workload.

SUMMARY OF THE INVENTION

These and other objects of the invention are provided in a cable pulling apparatus for pulling a work load attached to a cable, including at least one cable-pulling device for engaging the cable. The cable-pulling device or devices each includes at least one cable-pulling member fitted with a cable-gripping element for pulling the cable and the workload.

BRIEF DESCRIPTION OF THE DRAWINGS

The invention will be better understood by reference to the accompanying drawings wherein:

FIG. 1A is a top view of the spring-loaded wedge and cable-pulling apparatus illustrated in FIG. 1, with the cable-pulling apparatus pistons in extended configuration;

FIG. 2 is a top view, partially in section, of the spring-loaded wedge and cable-pulling apparatus illustrated in FIG. 1, with the cable-pulling apparatus pistons in retracted, pulling configuration;

FIG. 3 is a side view of the spring-operated wedge seated in one of a pair of carriage arms of the cable-pulling apparatus illustrated in FIGS. 1A and 2;

FIG. 4 is a schematic diagram illustrating the spring-operated wedge and cable-pulling apparatus in pulling configuration located on one side of a road;

FIG. 5 is a schematic view illustrating the spring-operated wedge and cable-pulling apparatus in pulling configuration located on the opposite side of the road;

FIG. 21 is a sectional view, taken along section line 21—21 in FIG. 20, of the cable-gripping and pulling members;

FIG. 22 is a sectional view, taken along section line 22—22 in FIG. 20, of the cable-gripping and pulling members;

DESCRIPTION OF THE PREFERRED EMBODIMENTS

Figure 1:
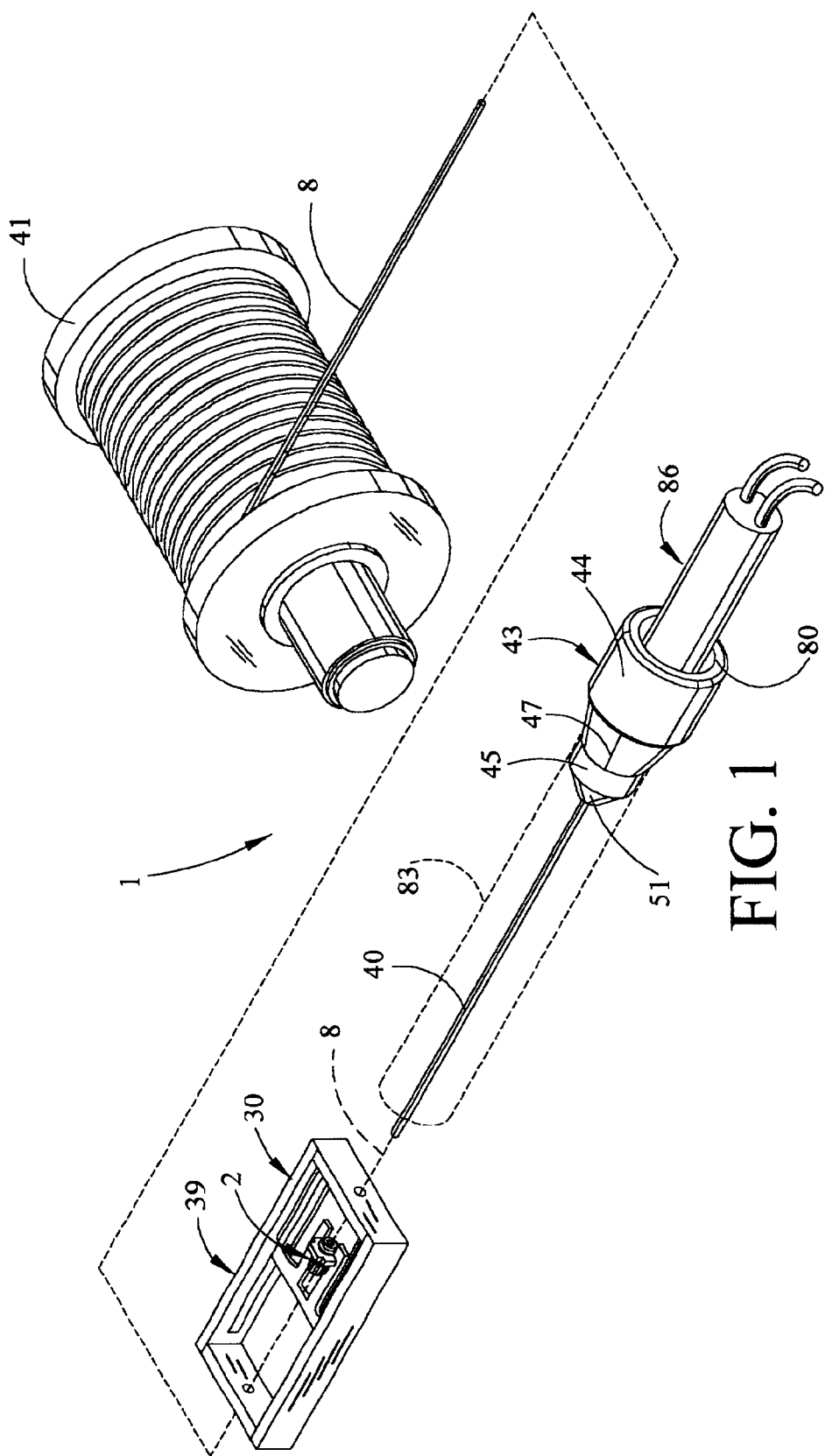
FIG. 1 is a perspective view of a preferred embodiment of the cable-pulling apparatus, including a single spring-loaded wedge and cooperating cable-pulling apparatus, with a pull cable wound on a spool or reel fitted with a winch and connected to a pipe-bursting apparatus, the cable-pulling apparatus positioned for pulling the pipe-bursting apparatus through a damaged pipe in the ground.
Figure 6:
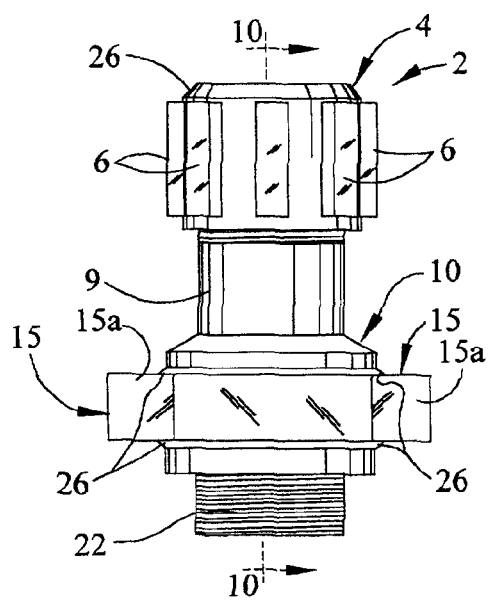
FIG. 6 is a top view of the spring-operated wedge in assembled configuration for mounting in a cable-pulling frame or driving apparatus.

Referring initially to FIGS. 1–5 of the drawings in a first preferred embodiment, the cable-pulling apparatus of this invention is generally illustrated by reference numeral 1. The cable-pulling apparatus 1 is characterized by a spring-operated wedge 2, typically mounted in a cable-pulling apparatus 30, with a cable 8 of selected diameter, typically wound on a reel 42, extending through the spring-loaded wedge 2 and from each end of the frame 39 of the driving apparatus 30. The reel 42 may be equipped with a winch 46 for purposes which will be hereinafter described. It will be appreciated by those skilled in the art that the spring-operated wedge 2 of this invention can be used with any size cable 8 and any properly designated cable-pulling apparatus 30, the cable-pulling apparatus 30 illustrated in the drawing being specifically designed to receive and mount the spring-operated wedge 2 in pulling configuration, as hereinafter further described. Accordingly, as illustrated in FIGS. 1, 4 and 5, the pulling apparatus 30 and the mounted spring-operated or loaded wedge 2 can be positioned as illustrated to pull the cable 8 and a workstock or work load such as a pipe-bursting device or head 43 and/or a pipe through the ground or terrain 40 beneath a barrier such as a road 41, as hereinafter described.

Referring again to FIGS. 1–5 of the drawings during a workstock or work load pulling operation, the cable 8 and load are extended through or over the terrain 40, typically beneath the barrier or road 41, by extending and retracting a pair of cylinder pistons 35, seated in respective parallel, double-action hydraulic cylinders 34 and connected to the carriage arms 33, respectively, typically operated in cooperation with a winch 46, mounted on the reel 42, illustrated in FIG. 1. Accordingly, the cable 8 can be pulled through or over the terrain 40, whether the frame 39 is located on the right or left-hand side of the terrain 40 (FIGS. 4 and 5) and a pipe or other workstock or load, such as a truck or other vehicle in a ditch or the like, attached to the end of the cable 8, can be similarly pulled through or over the terrain 40, as desired, as the cable 8 is tensioned by the winch 46. The extension and retraction of the cylinder pistons 35 from and into the hydraulic cylinders 34 is effected by operation of a valve 36, controlled by manipulation of a control lever 38, which causes hydraulic fluid to flow from a tank (not illustrated) through the hoses 37 and the valve 36, to operate the hydraulic cylinders 34, according to the knowledge of those skilled in the art. A storage tank or vessel and associated hoses and fittings (not illustrated) for the hydraulic fluid may be typically provided on a truck or other vehicle (not illustrated) along with the reel 42 as desired, for mobile operation of the cable-pulling apparatus 1.

Figures 11, 12:
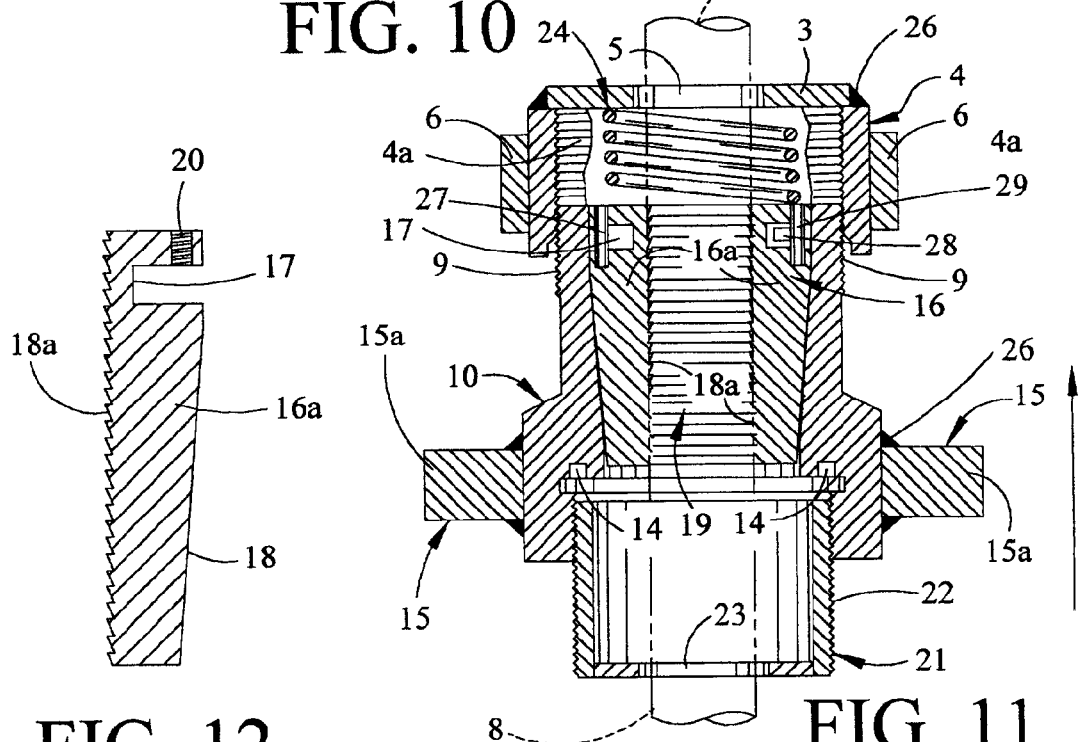
FIG. 11 is a sectional view, also taken along 10—10 of the spring-operated wedge illustrated in FIG. 6, more particularly illustrating the engagement of the internal wedge elements with the cable and the internal spring in relaxed configuration responsive to operation of the cable-pulling apparatus to pull the cable and a workstock over or through the ground.
FIG. 12 is a sectional view of a typical wedge segment of the wedge illustrated in FIGS. 9–11.
Figure 13:
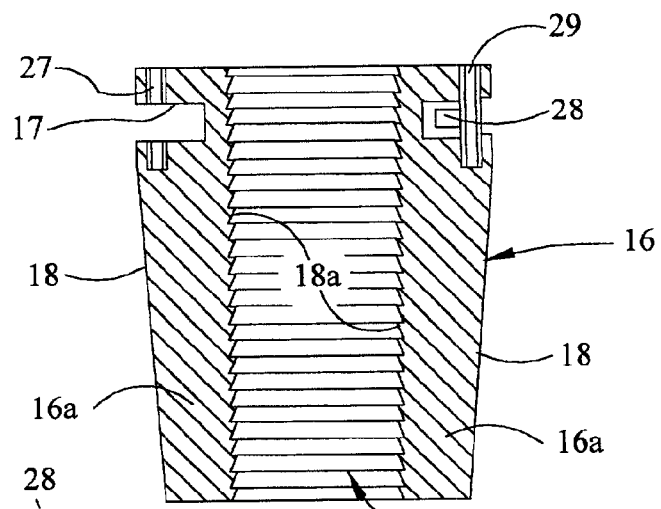
FIG. 13 is a sectional view taken along line 13—13 in FIG. 14, of a pair of wedge segments of the wedge illustrated in FIG. 14.
Figure 14:
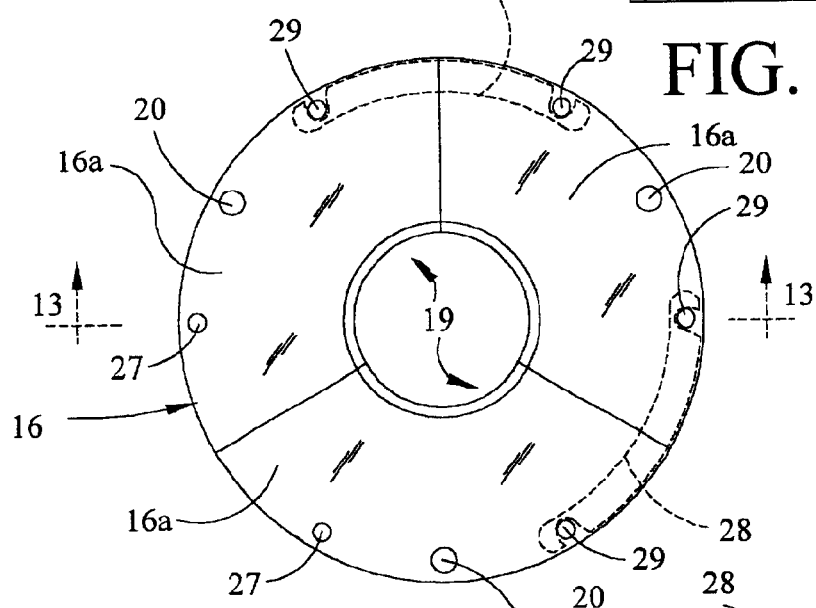
FIG. 14 is a top view of the wedge illustrated in FIGS. 9–11, more particularly illustrating a pivoting construction of the wedge segments.

Referring now to FIGS. 1, 1A, 2, 9 and 12–15 of the drawings, the spring-operated wedge 2 is designed to removably engage the pulling apparatus 30 by means of a mount plate 15, having outwardly-extending mount plate flanges 15a, for fitting in the carriage slot 32 of the carriage 31. The mount plate 15 is typically welded by means of welds 26 to a cylindrical adaptor body 10, having internal lower adaptor body threads 13 and external upper adaptor threads 9. A taper bore 11 is provided in the upper end of the adaptor body 10 adjacent to a lower, non-tapered bore 12 and near the upper adaptor body threads 9, for receiving a wedge 16, which typically includes an articulating assembly of three wedge segments 16a, joined to define a wedge bore 19, as illustrated in FIG. 14. Each wedge segment 16a has multiple angled wedge teeth 18a and a wedge taper 18 that matches the taper bore 11 in the adaptor body 10. The wedge bore 19 extends through the assembled, articulating wedge segments 16a of proportional size to accommodate a cable 8 of selected diameter, as further illustrated in phantom in FIG. 9. Circumferential retainer pin slots 17 are also provided in the top portion of the wedge segments 16a, for purposes which will be hereinafter further described.

Figure 7:
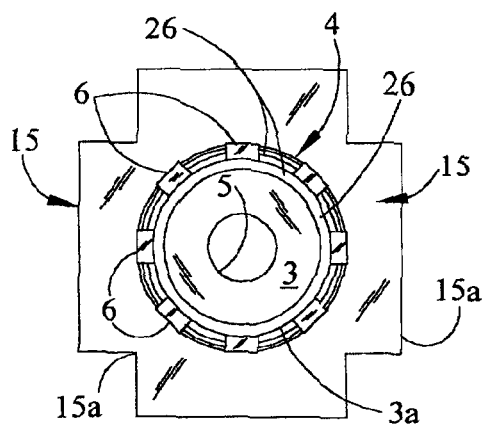
FIG. 7 is a front view of the spring-operated wedge illustrated in FIG. 6.
Figure 8:
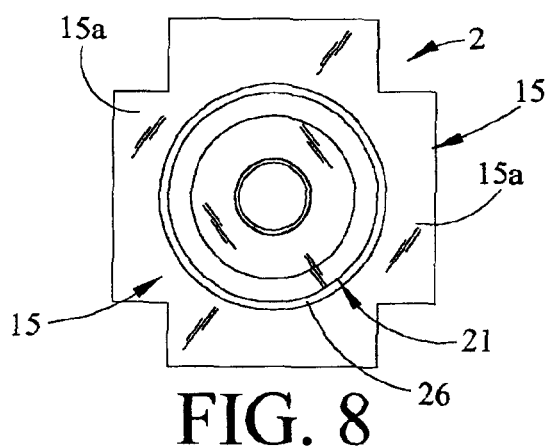
FIG. 8 is a rear view of the spring-operated wedge illustrated in FIGS. 6 and 7.
Figure 9:
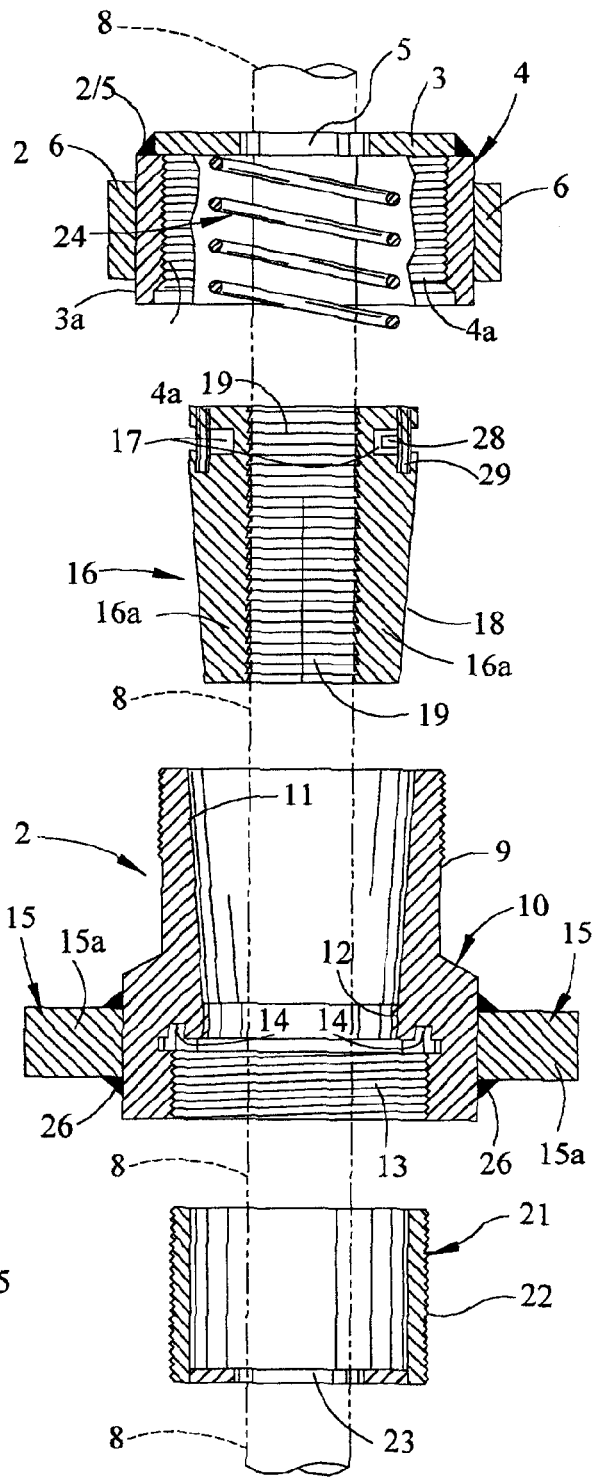
FIG. 9 is an exploded sectional view of the spring-operated wedge illustrated in FIGS. 6–8.

As further illustrated in FIG. 9, a cylindrical male coupling seat 14 is inscribed in the interior of the adaptor body 10 adjacent to the lower adaptor body threads 13 to accommodate the top circular edge of a cylindrical male coupling 21, fitted with male coupling threads 22 and also having a male coupling cable opening 23 to accommodate the cable 8. Accordingly, the male coupling 21 defines the rear end of the spring-operated wedge 2, as illustrated in FIG. 8. A pipe coupling 4 defines the front end of the spring-operated wedge 2 and closes the adaptor body 10 as illustrated in FIG. 7. The pipe coupling 4 includes a cover plate 3, typically welded to the top end of a cylindrical collar 3a at a weld 26 and includes internal coupling threads 4a in the collar 3a, as illustrated in FIG. 9. Multiple hammer flanges 6 are typically radially welded to the collar 3a for assembling and disassembling the pipe coupling 4 on the front or upper end of the adaptor body 10 as the internal pipe coupling threads 4a engage the external upper adaptor body threads 9 of the adaptor body 10. A cover plate cable opening 5 is provided in the cover plate 3 for accommodating the cable 8, as further illustrated in FIG. 9. A coil spring 24 is also provided in the pipe coupling 4 and encircles the cable 8, with one end of the coil spring 24 typically welded to the cover plate 3 and the opposite end intermittently engaging the top surface of the wedge 16 during operation of the cable-pulling apparatus 1, as hereinafter described. Accordingly, when the pipe coupling 4 and the male coupling 21 are threadably assembled on the adaptor body 10 the spring-loaded wedge 2 is configured as illustrated in FIGS. 6–9 of the drawings.

Figure 10:
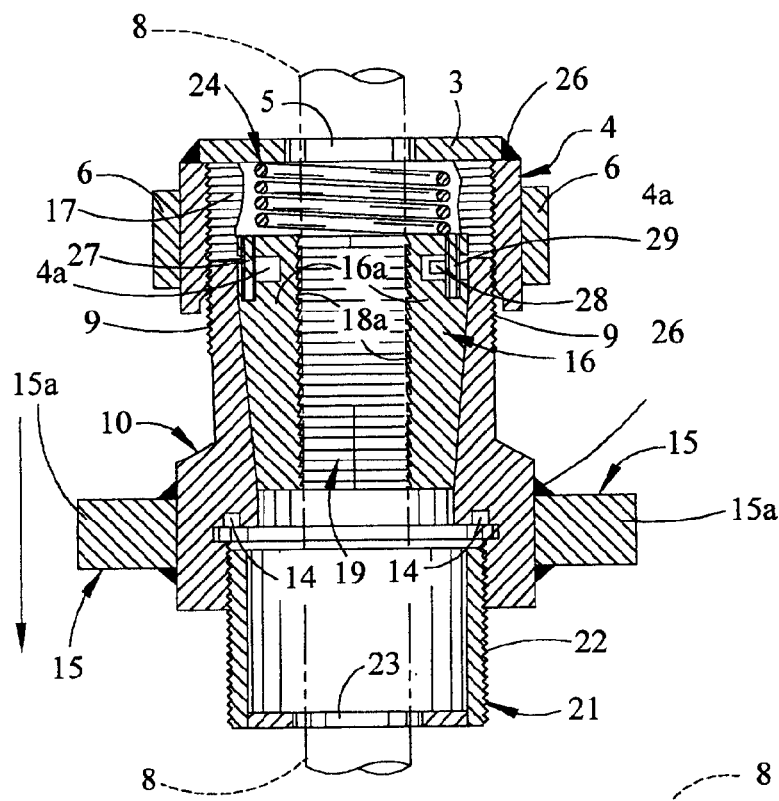
FIG. 10 is a sectional view taken along line 10—10 in FIG. 6, more particularly illustrating the internal spring-operated wedge in released configuration, with a spring compressed to facilitate return of the wedge elements to the cable-engaging positioned within the spring-operated wedge.
Figure 15:
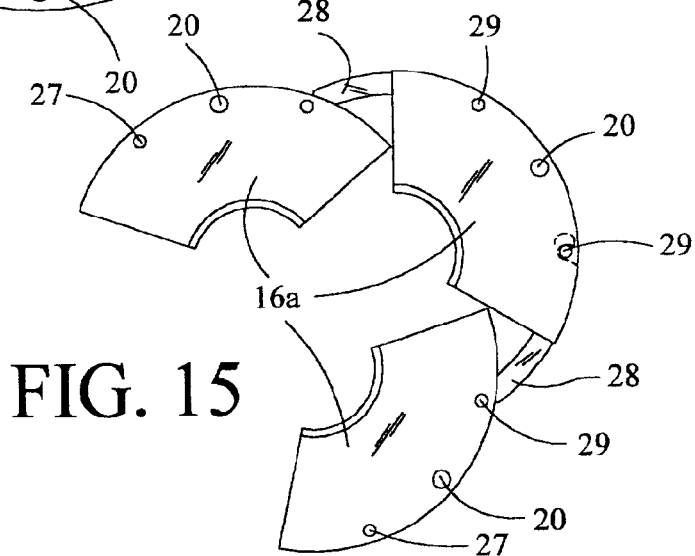
FIG. 15 is a top view of the wedge illustrated in FIG. 14, illustrating two of the wedge segments pivoted from the third wedge segment.

Referring now to FIGS. 12–15 of the drawings in a preferred embodiment of the invention the wedge segments 16a are assembled in articulating, pivoting fashion to define the wedge 16 by means of a pair of retainer bars 28, illustrated in phantom in FIG. 14 and shown in FIG. 15, which slidably engage the circumferential retainer pin slots 17 provided in the respective wedge segments 16a. The retainer bars 28 are maintained in position in the curved retainer pins slots 17 by means of roll pins 29, inserted in roll pin seats 27, that extend through the retainer pin slots 17, as illustrated in FIG. 13. Threaded holes 20 are also provided in each of the wedge segments 16a as illustrated in FIGS. 12, 14 and 15, for accommodating threaded studs (not illustrated) and removing the wedge segments 16a from the adaptor body 10. Since only two retainer bars 28 are provided in adjacent areas of the respective wedge segments 16a, all three wedge segments 16a are maintained in the assembled configuration illustrated in FIG. 14 while the wedge 16 is mounted in the spring-operated wedge 2, as heretofore described. However, under circumstances where it is desirable to disassemble the wedge 16 for cleaning or replacement purposes, the wedge 16 can be first removed from the adaptor body 10 by threading the threaded studs (not illustrated) into the threaded holes 20 after the pipe coupling 4 is unthreaded from the upper adaptor body threads 9 of the adaptor body 10. Two of the wedge segments 16a can then be pivoted from the third wedge segment 16a on the corresponding roll pins 29 as illustrated in FIG. 15. Complete disassembly of the wedge segments 16a can be achieved by driving the roll pins 29 from the accompanying roll pin seats 27 and removing the corresponding retainer bars 28 from the respective retainer pin slots 17. The respective wedge segments 16a are able to "articulate", or pivot inwardly and outwardly on the retainer bars 28 and the roll pins 29 in both the horizontal and vertical planes as the spring-operated wedge 2 is viewed in FIGS. 10 and 11.

Referring again to FIGS. 1, 1A, 2, 10 and 11 of the drawings, the cable-pulling apparatus 1 embodied in FIGS. 1–15 of this invention is operated as follows. When the spring-operated wedge 2 is mounted in the carriage slot 32 of the carriage 31 of the pulling apparatus 30 as illustrated in FIG. 1, a cable 8 of selected diameter is unwound from the reel 42, which is typically fitted with a winch 46, and deployed through a spring-operated wedge 2 of proportional size, as illustrated. The cable 8 is then attached to a workstock or load such as the nose cap 51 on the nose 45 of the pipe bursting head 43, illustrated in FIG. 1, and the cable 8 and bursting head 43 are ready to be pulled through the terrain 40 beneath a barrier such as a road 41, as illustrated in FIGS. 4 and 5. In each case, pressure is applied to the mount flange 15a of the spring-operated wedge 2 by movement of the carriage 31 through retraction of the cylinder pistons 35 into the respective hydraulic cylinders 34, as illustrated in FIG. 2. Before this action, the wedge segments 16a articulate or pivot inwardly on the retainer bars 28 and the wedge 16 is slidably extended toward the male coupling 21 in the taper bore 11 of the adaptor body 10 by the tension in the coil spring 24, as illustrated in FIG. 11. This tension in the coil spring 24 is adjusted by threading the pipe coupling 4 on the upper end of the adaptor body 10, such that the wedge teeth 18a of the wedge segments 16a which define the wedge 16 engage the cable 8 and remain so engaged upon motion of the carriage 13 and the pulling apparatus 30 in the direction of the arrows in FIG. 2. Accordingly, engagement of the wedge teeth 18a with the cable 8 is effected by articulation of the wedge segments 16a inwardly about the retainer bars 28 as the forward motion of the spring-operated wedge 2 begins in the direction of the arrows illustrated in FIGS. 2 and 11 by operation of the driving apparatus 30. This action pulls the cable 8 and the pipe bursting head 43 and casing blade 47 incrementally through the damaged pipe 83 in the terrain 40 and compressing the coil spring 24 against the wedge 16. Further manipulation of the control lever 38 to reverse movement of the carriage 31 and the spring-operated wedge 2 extends the cylinder pistons 35 from the hydraulic cylinders 34 as illustrated in FIG. 1A and as the winch 46 is engaged to maintain tension on the cable 8, this action causes the wedge teeth 18a to articulate outwardly by application of spring tension and release or relax from engagement with the cable 8 as the spring-operated wedge 2 moves with the carriage 30 in the opposite direction, further as imputed in FIG. 10. The tension in the coil spring 24 forces the wedge 16 toward the male coupling 21, causing the wedge teeth 18a to again engage the cable 8 when the spring-operated wedge 2 is in the position illustrated in FIG. 11, and the procedures is repeated, thus incrementally and sequentially pulling the cable 8 and the pipe bursting head 43 through the damaged pipe 83 in the terrain 40 and under the road 41, while the hammer 86 typical intermittently strikes the pipe bursting head 43 and the expander 44 breaks or bursts the damaged pipe 83. A replacement pipe 80 can be laid in the same tunnel as the damaged pipe 83, as desired, as further illustrated in FIG. 1.

In an alternative preferred embodiment of the invention, the pulling apparatus 30 can be set up in a trench or depression or in any location on the terrain 40 along which the cable 8 has been deployed, for engaging the cable 8 and pulling a work load along the terrain 40. This application of the pulling apparatus 30 is particularly applicable to pulling vehicles such as heavy trucks from ditches or other areas, moving derailed engines and rail cars and the like.

Figure 16:
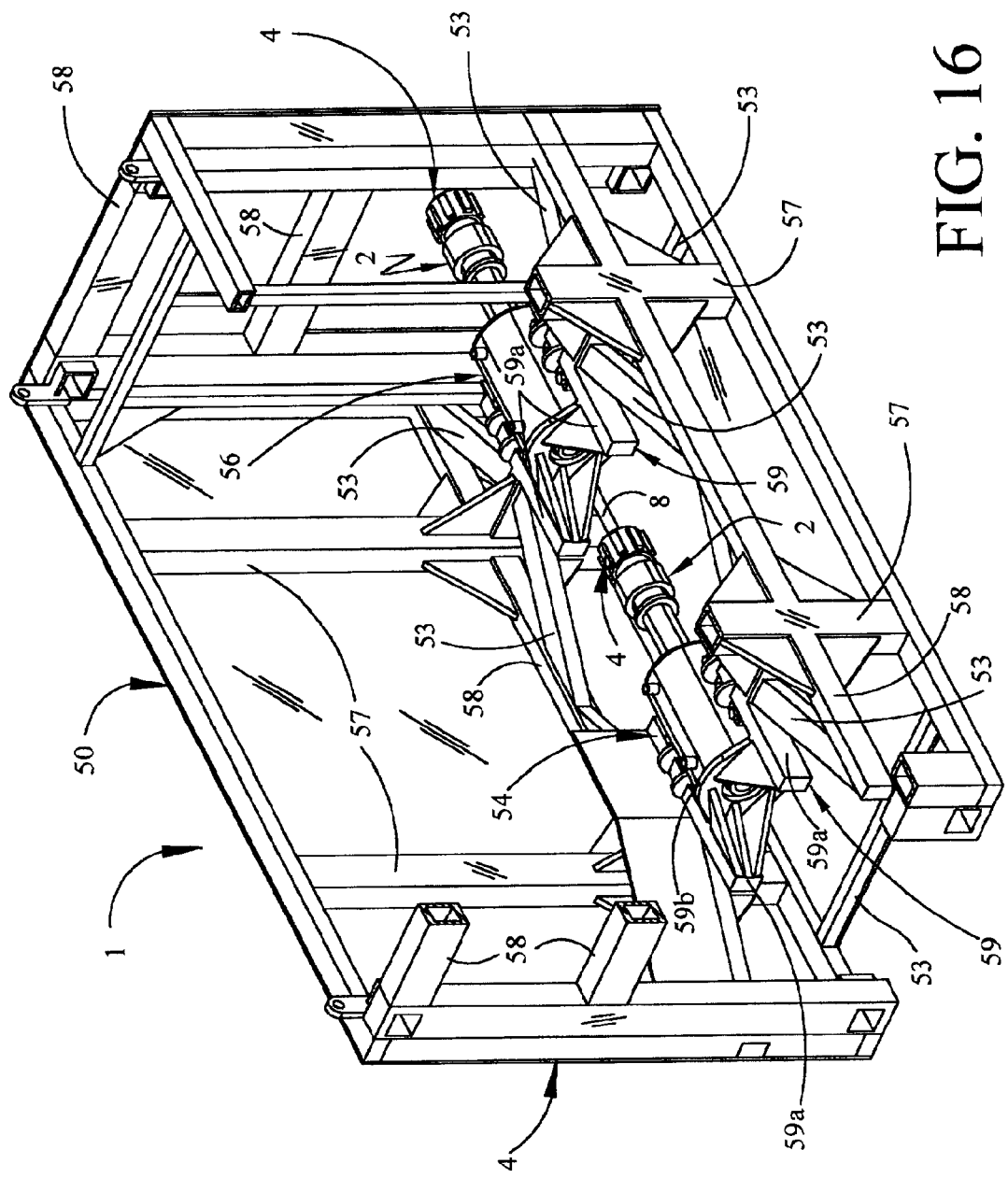
FIG. 16 is a perspective view, partially in section, of an illustrative frame for an alternative embodiment of the cable-pulling device or apparatus of this invention.
Figure 17:
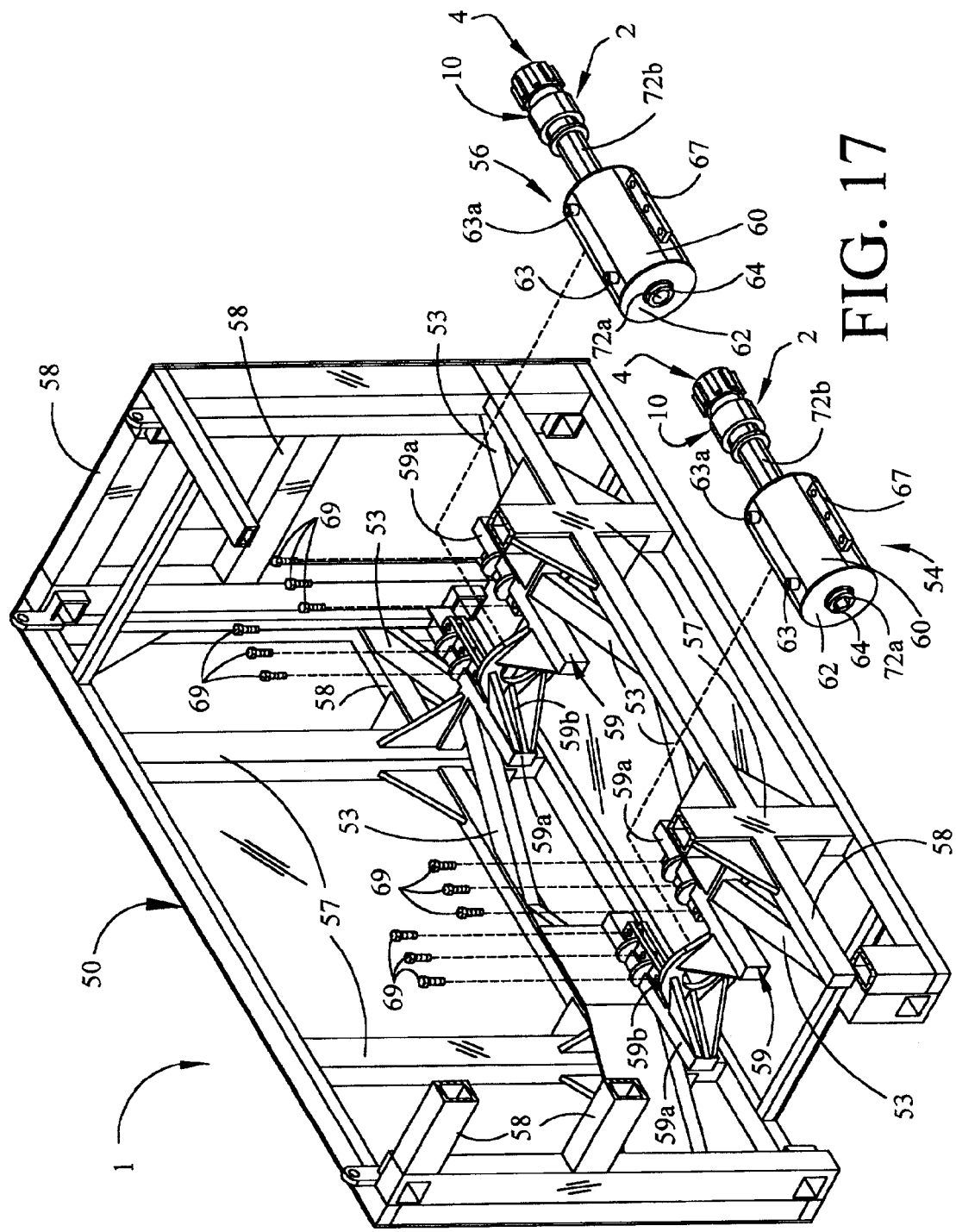
FIG. 17 is an exploded, perspective view, partially in section, of the cable-pulling members and wedges of the cable-pulling device illustrated in FIG. 16, more particularly illustrating a preferred bolting technique for mounting a pair of in-line cable-gripping and pulling members and associated spring-operated wedges on the frame.
Figure 18:
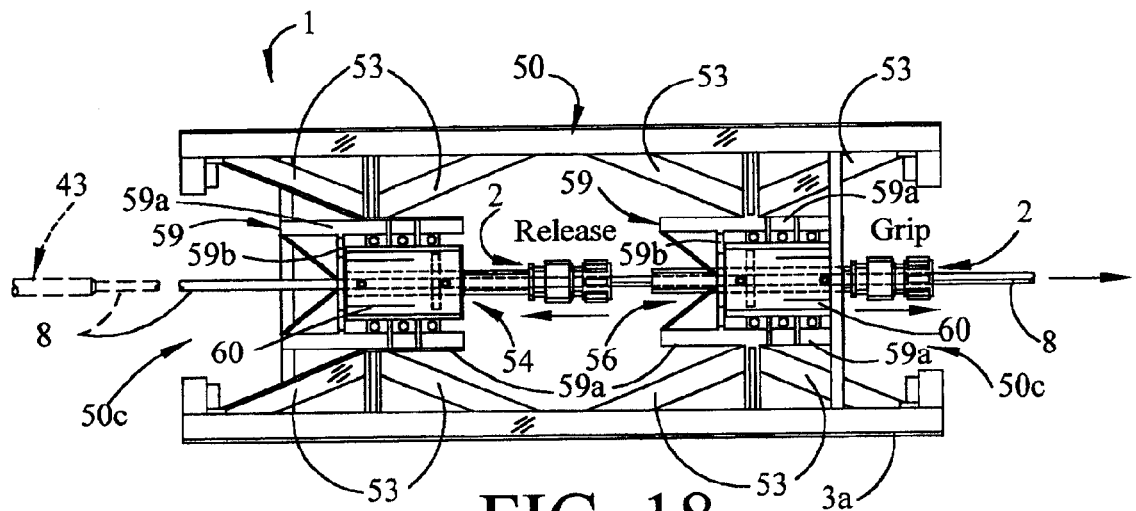
FIG. 18 is a top view of the cable-pulling device, with a rear cable-gripping and pulling member shown in the cable-gripping and pulling configuration and a front cable-gripping and pulling member shown in the cable-releasing configuration in typical operation of the apparatus of this invention.
Figure 19:
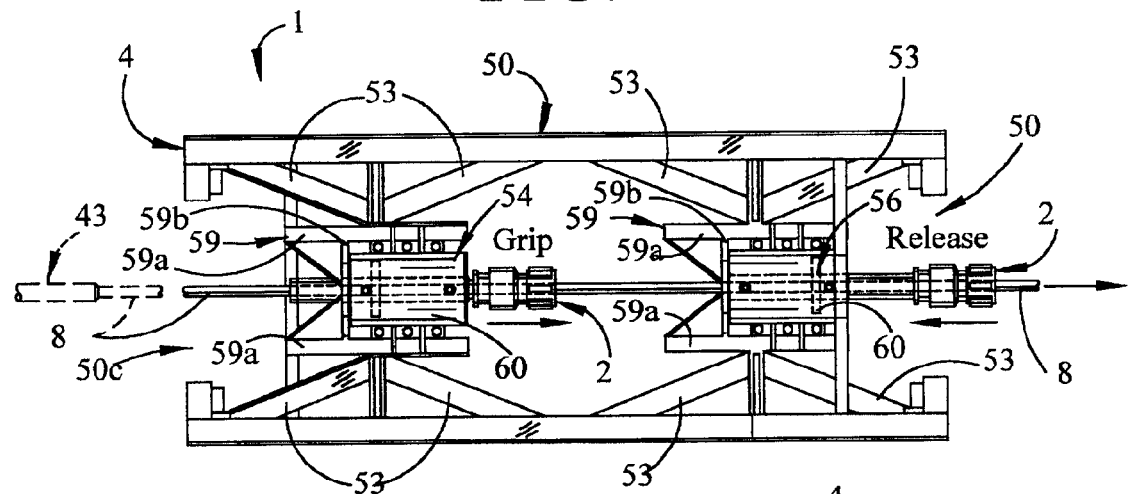
FIG. 19 is a top view of the cable-pulling device illustrated in FIG. 18, with the rear cable-gripping and pulling member shown in the cable-releasing configuration and the front cable-gripping and pulling member shown in the cable-gripping configuration in typical operation of the apparatus.

Referring now to FIGS. 16 and 17 of the drawings, in another preferred embodiment of this invention the cable-pulling apparatus 1 is typically characterized by a typically steel housing 50, having a typically rectangular cable opening in the ends thereof The housing 50 typically mounts a front double-action hydraulic cable-pulling member 54 and a substantially identical rear hydraulic cable-pulling member 56, as illustrated in FIGS. 16 and 17 and hereinafter described. It will be appreciated by those skilled in the art that the front hydraulic cable-pulling member 54 and/or the rear hydraulic cable-pulling member 56 of the cable-pulling apparatus 1 of this invention can be used with any properly designed housing frame 52, the housing frame 52 illustrated in FIGS. 16 and 17 of the drawings being specifically designed to receive and mount the front cable-pulling member 54 and rear cable-pulling member 56 in substantially aligned relationship with respect to each other in cable-pulling configuration, as hereinafter further described. Typically, the housing 50 includes parallel, vertical brace members 57 on each side of the housing 50, and a pair of horizontal brace members 58 span the end vertical brace members 57 on each side of the housing 50. Mount frame braces 53 are typically welded to various structural parts of the housing 50, as further illustrated in FIGS. 16 and 17. A pair of driving member mount frames 59, adapted for receiving and mounting the corresponding front cable-pulling member 54 and rear cable-pulling member 56, as hereinafter described, are mounted between the corresponding pairs of mount frame braces 53 on opposite sides of the housing 50. Each driving member mount frame 59 is typically characterized by a pair of elongated, parallel mount bars 59a, which are typically welded to the corresponding pair of angled mount frame braces 53 on the corresponding side of the housing 50, and a typically circular mount flange 59b is mounted between each pair of parallel mount bars 59a.

As further illustrated in FIGS. 16 and 17, the aligned front cable-pulling member 54 and rear cable-pulling member 56 of the cable-pulling apparatus 1 are designed to receive and continually pull a cable 8 through the cable-pulling apparatus 1 by alternately and repeatedly gripping, pulling and releasing the cable 8, as hereinafter described. As illustrated in FIGS. 20–24, the double-action hydraulic front cable-pulling member 54 and rear cable-pulling member 56 are each typically characterized by an elongated hydraulic cylinder 60, having an interior fluid chamber 61 (FIGS. 21 and 22), each end of which is sealed by an end plate 62, typically threaded into the corresponding end of the hydraulic cylinder 60. As further illustrated in FIG. 20, a front hydraulic fluid port 63 and a rear hydraulic fluid port 63a are provided in fluid communication with the fluid chamber 61 of each hydraulic cylinder 60, adjacent to respective ends thereof for attachment to a conventional hydraulic pump system (not illustrated) and facilitating selective flow of hydraulic fluid (not illustrated) into and out of the fluid chamber 61 through the front hydraulic fluid port 63 or rear hydraulic fluid port 63a, as hereinafter described A first pipe segment 72a of an elongated cable pipe 72 is positioned in a central plate opening (not illustrated) provided in one of the end plates 62, and is sealed against the end plate 62, typically by means of multiple o-rings 64. The first pipe segment 72a is typically joined to a second pipe segment 72b of the cable pipe 72 in the fluid chamber 61 of the hydraulic cylinder 60 at a piston 65. The second pipe segment 72b is slidably mounted in a central plate opening (not illustrated) provided in the second end plate 62, and is sealed therein, typically by means of additional o-rings 64. A disc-shaped piston 65 is slidably disposed in the fluid chamber 61 of each hydraulic cylinder 60, is seated on the cable pipe 72, typically at the junction of the first pipe segment 72a with the second pipe segment 72b and is sealed against the cylindrical interior surface of the hydraulic cylinder 60, typically by means of a piston o-ring 66. Accordingly, pressurized flow of hydraulic fluid from a hydraulic pump system (not illustrated), through a selected one of the front hydraulic fluid port 63 and rear hydraulic fluid port 63a and into the fluid chamber 61 of the respective hydraulic cylinders 60 facilitates application of fluid pressure to either face of the piston 65, thereby causing the piston 65 and cable pipe 72 to traverse the fluid chamber 61 in a selected direction as the cable pipe 72 is slidably extended through the respective end plates 62.

A pair of cylinder mount flanges 67 is mounted on each hydraulic cylinder 60 in substantially diametrically-spaced relationship with respect to each other, and each is provided with multiple bolt openings 68. As further illustrated in FIGS. 16 and 17, the front cable-pulling member 54 and rear cable-pulling member 56 are each mounted on the corresponding aligned driving member mount frame 59 in the housing 50 by seating the front cable-pulling member 54 and the rear cable-pulling 56 on the respective driving member mount frames 59, with the respective cylinder mount flanges 67 resting on corresponding mount bar flanges (not illustrated) provided on the mount bars 59a. Mount bolts 69 (FIG. 17) are extended through the respective bolt openings 68 of the cylinder mount flanges 67 and threaded into respective bolt openings (not illustrated) provided in the mount bar flanges, to secure the front cable-pulling member 54 and rear cable-pulling member 56 on the respective driving member mount frames 59 in substantially aligned relationship with respect to each other in the housing 50, as particularly illustrated in FIGS. 16 and 17.

Figure 20:
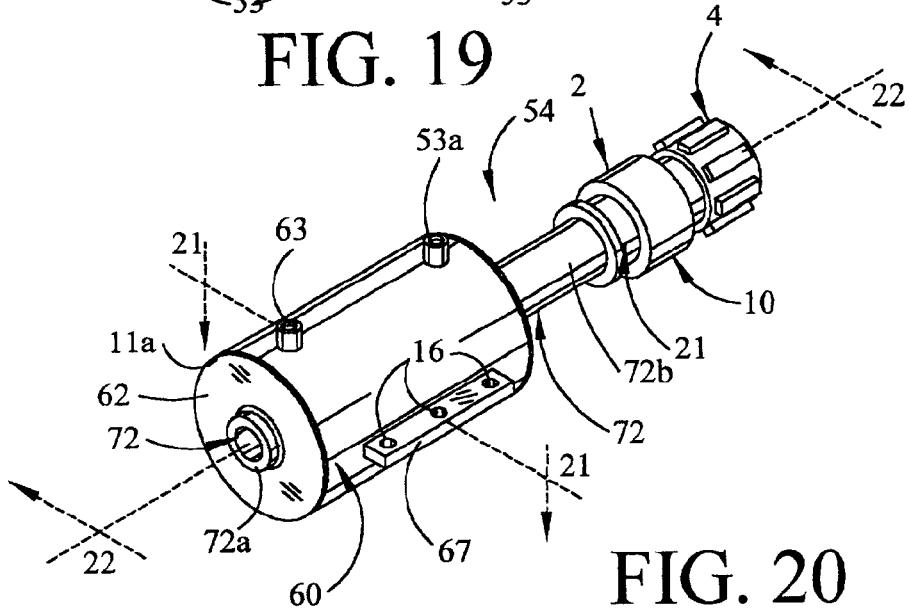
FIG. 20 is a perspective view of cable-gripping and pulling components of the cable-pulling device or apparatus.

As further illustrated in FIG. 20, a cable-gripping element or spring-operated wedge 2, is typically fitted on the cable 8 and on the second pipe segment 72b of the cable pipe 72 and each spring-operated wedge 2 is characterized by the cable-gripping elements heretofore described with respect to FIGS. 7–13 of the drawings.

Figure 23:
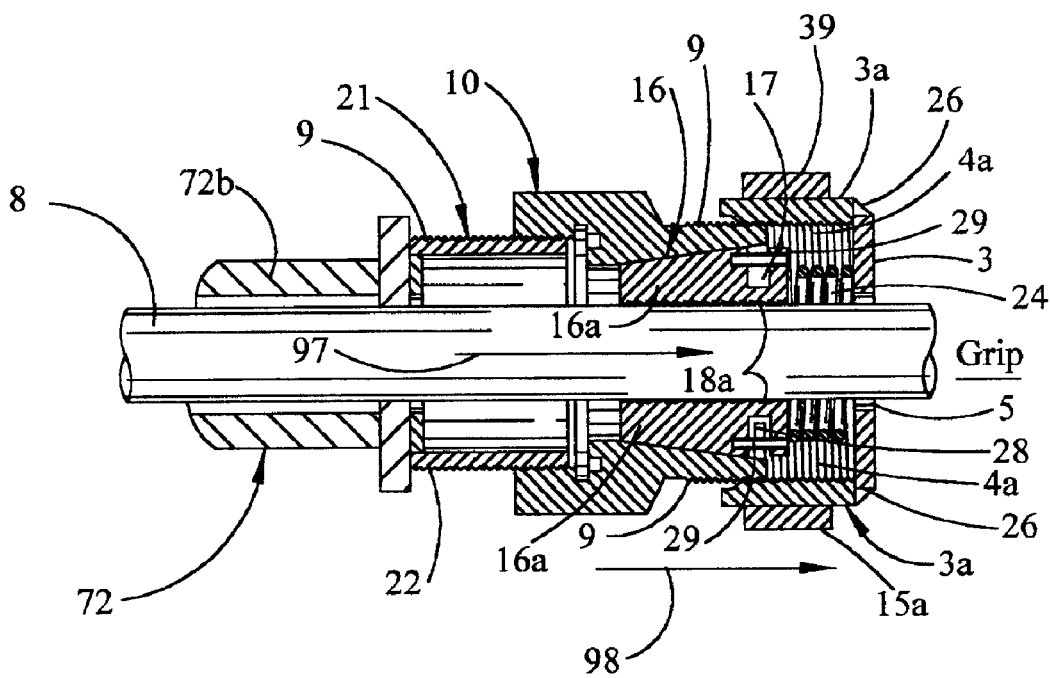
FIG. 23 is a longitudinal sectional view of a cable-gripping element of each front and rear cable-gripping and pulling member set, more particularly illustrating the spring and wedge-operated cable-gripping element in the cable-gripping configuration in operation of the apparatus.
Figure 24:
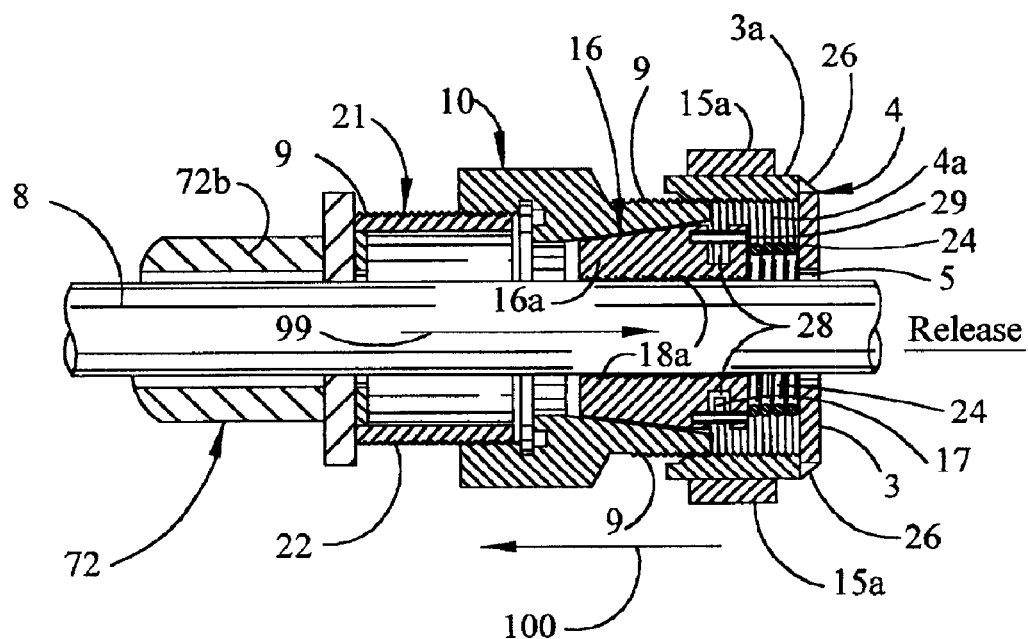
FIG. 24 is a longitudinal sectional view of the cable-gripping element of each front and rear cable-gripping and pulling member set, more particularly illustrating the spring and wedge-operated cable-gripping element in the cable-release configuration in operation of the apparatus.

Referring now to FIGS. 9 and 16–24 of the drawings, in operation of the second preferred embodiment of the cable-pulling apparatus 1, in a typical application, the pull cable 8 is initially extended through the cable pipe 72 and the attached spring-operated wedges 2 of the respective aligned and frame-mounted front cable-pulling member 54 and rear cable-pulling member 56, as illustrated in FIGS. 16 and 17, with the pull cable 8 extending through the opposite cable openings 50c in the housing 50 (FIGS. 16 and 17). The pipe coupling 4 (FIGS. 21 and 22) is initially partially threaded on the adaptor body 10 of the spring-operated wedge 2 of each corresponding front cable-pulling member 54 and rear cable-pulling member 56, to slightly compress the coil spring 24 between the cover plate 3 of the pipe coupling 4 and the wedge segments 16a of each wedge 16 (FIG. 9). This action causes the corresponding wedge segments 16a to pivot inwardly on the retainer bars 28 and thus, the wedge teeth 18a to lightly engage the cable 8, as the coil spring 24 partially forces and compresses each wedge 16 into the narrowing tapered bore (not illustrated) of the corresponding adaptor body 10. Pressurized hydraulic fluid (not illustrated) is then introduced into the fluid chamber 61 of the hydraulic cylinder 60 of the rear cable-pulling member 56, through the front hydraulic fluid port 63 (FIG. 20) thereof. The hydraulic fluid applies pressure to the piston 65 to facilitate rearward displacement of the piston 65 in the fluid chamber 61, as indicated by the arrow in FIG. 21 and thus, rearward extension of the cable pipe 72 from the hydraulic cylinder 60 of the rear cable-pulling member 56 and rearward movement of the spring-operated wedge 2 of the rear cable-pulling member 56, as further indicated by the arrow 98 in FIG. 23. Simultaneously, friction between the wedge teeth 18a of the wedge segments 16a and the initially stationary pull cable 8 causes the wedge 16 to initially remain stationary with the pull cable 8 inside the moving spring-operated wedge 2 and slide into the increasingly narrow portion of the tapered bore of the spring-operated wedge 2, assisted by the compressed coil spring 24. Consequently, the wedge segments 16a of the wedge 16 tend to compress in the spring-operated wedge 2 and pivot inwardly on the retainer bars 28, and the wedge teeth 18a thus tightly engage the pull cable 8, as illustrated in FIG. 23. Continued rearward extension of the cable pipe 72 from the hydraulic cylinder 60 and thus rearward movement of the spring-operated wedge 2 as further indicated by the arrow 98 in FIG. 23, causes the spring-operated wedge 2 of the rear cable-pulling member 56, tightly gripping the pull cable 8 at the wedge teeth 18a, to pull the pull cable 8 rearwardly through the housing 50 of the cable-pulling device 2, as indicated by the arrow 97 in FIG. 23 and as further illustrated in FIG. 18. After the full throw or extension of the cable pipe 72 (FIG. 24) from the hydraulic cylinder 60 of the rear cable-pulling member 56 has been reached, like extension of the corresponding cable pipe 72 from the hydraulic cylinder 60 of the front cable-pulling member 54 is begun by introducing pressurized hydraulic fluid into the front hydraulic fluid port 63 (FIG. 20) of the front cable-pulling member 54. This action facilitates rearward extension of the cable pipe 72 from the hydraulic cylinder 60 and thus, gripping and pulling of the pull cable 8 by operation of the spring-operated wedge 2 of the front cable-pulling member 54, also as illustrated in FIG. 23 and in FIG. 19, in the same manner as heretofore described with respect to the rear cable-pulling member 56 with regard to FIG. 23. Simultaneously, pressurized hydraulic fluid is introduced into the fluid chamber 61 of the hydraulic cylinder 60 of the rear cable-pulling member 56, through the rear hydraulic fluid port 63a, and the hydraulic fluid pushes the piston 65 rearwardly in the fluid chamber 61 in the direction indicated by the arrow in FIG. 22. Consequently, the cable pipe 72 and attached spring-operated wedge 2 of the rear cable-pulling member 56 are drawn forwardly as indicated by the arrow 100 in FIG. 24, while the pull cable 8 is pulled rearwardly through the rear cable-pulling member 56 as indicated by the arrow 99 (FIG. 24), by simultaneous operation of the front cable-pulling 54, as heretofore described. This forward motion of the spring-operated wedge 2 of the rear cable-pulling member 56, indicated by the arrow 100 in FIG. 24, causes the friction between the wedge teeth 18a of the wedge segments 16a of the initially stationary wedge 16 and the pull cable 8, moving in the rearward direction as indicated by the arrow 99 (FIG. 24), to draw the wedge 16 into the wider portion of the tapered bore of the spring-loaded wedge 2, as further illustrated in FIG. 24. Consequently, the wedge 16 slightly expands in the tapered bore of the spring-operated wedge 2 as the wedge segments 16a pivot on the retainer bars 28. The wedge teeth 18a thus only lightly engage the pull cable 8, and enable substantially unhindered sliding of the spring-loaded wedge 2 of the rear cable-pulling member 56 to the original grip position on the pull cable 8, as further illustrated in FIG. 23. After the spring-loaded wedge 2 of the rear cable-pulling 56 again reaches the grip position illustrated in FIG. 23 and in FIG. 19, the cable pipe 72 is again extended rearwardly from the hydraulic cylinder 60 of the rear cable-pulling member 56 to facilitate gripping and continued rearward extension of the pull cable 8 through the housing 50 of the cable-pulling apparatus 1, as the spring-operated wedge 2 of the front cable-pulling member 54, now disposed in the release configuration, again slides to the original grip position on the pull cable 8, as illustrated in FIG. 23. In the foregoing manner, the front cable-pulling member 54 and rear cable-pulling member 56 alternately and repeatedly grip, pull and release the pull cable 8 and while in the cable-release configuration, return to the original cable-gripping position to facilitate continuous alternate pulling of the pull cable 8 through the housing 3 of the cable-pulling apparatus 1.

Referring again to FIGS. 1, 16–24 of the drawings, in typical application of the second embodiment of the cable-pulling apparatus 1 of this invention the apparatus is initially typically located in a manhole or excavation (not illustrated) at one open end of a damaged or leaking underground gas, water, sewer or other utility pipe 83 (illustrated in phantom in FIG. 1) to be replaced. The pull cable 8 is extended through the pipe 83 to be replaced, and one end of the pull cable 8 is further extended through the front cable-pulling member 54 and the rear cable-pulling member 56 of the cable-pulling apparatus 1, with the pull cable 8 extending through the cable opening 50c at the front end of the housing 50, as illustrated in FIGS. 16 and 17 and as heretofore described. The pipe bursting head 43 is prepared as deemed necessary and under circumstances in which pipe valves, concrete encasement, timbers or other obstructions are likely to be encountered by the bursting head 43 in the pipe 83, a pneumatic hammer 86 is mounted on the pipe bursting head 43. The pull cable 8 is next connected to the nose cap 51 of the pipe bursting head 43 and the replacement pipe 80 (illustrated in FIG. 1) is typically removably screwed or bolted to the expander 44 of the bursting head 43, as heretofore described with respect to FIG. 1. The pull cable 8 is then further extended through the respective in-line cable-pulling and gripping members as heretofore described, until the pull cable 8 draws the nose 45 of the bursting head 43 into the pipe 83, and the pipe-cutting blades 47 engage the end of the pipe 83. The front cable-pulling member 54 and rear cable-pulling member 56 are then further operated in alternate pulling and release fashion as heretofore described, to continually draw the pull cable 8 rearwardly through the housing 50. Accordingly, this rearward motion of the pull cable 8 faces the blades 47 of the bursting head 43 forwardly against the pipe 83 to be replaced. As the blades 47 cut the pipe 83, the expander 44 of the bursting head 43 is pulled through the weakened, cut portion of the pipe 83, thus bursting the pipe 83 as the bursting head 43 is pulled progressively along the pipe 83. Simultaneously, the replacement pipe 80 is drawn into place behind the pipe bursting head 43, as illustrated in FIG. 1, until the bursting head 43 reaches the opposite end of the pipe 83 at the pulling device 2 and the entire length of the pipe 83 has been burst and the replacement pipe 80 fully drawn into place. Under circumstances in which the nose 45 of the bursting head 43 encounters significant obstructions in the pipe 83, the hammer 86 can be operated according to conventional procedures to repeatedly strike the expander 44 and in rapid succession drive the bursting head 43 against the pipe 83. The constant pulling action of the front cable-pulling member 54 and the rear cable-pulling member 56 in sequence on the pull cable 8, combined with the intermittent pushing action of the hammer 86 on the expander 44 causes the bursting head 43 to progressively cut and burst the pipe 83 and cut through obstructions in the pipe 83 as the bursting head 43 migrates along the pipe 83 and draws the replacement pipe 80 into position. Finally, the bursting head 43 is removed from the replacement pipe 80 by unthreading from the expander 44 and the replacement pipe 80 is connected to the utility piping system (not illustrated) of which the replacement pipe 80 is a part.

It will be appreciated by those skilled in the art that the cable-pulling apparatus and method of this invention is versatile and easy to use and can be applied to a cable 8 of substantially any desired size, although a typical size for the cable 8 is typically about one and one-eighth inch to about three inches in diameter, but may be typically any desired diameter for the purpose. Furthermore, while the cable 8 can be normally used to provide a pilot hole or opening through the terrain 40 beneath the barrier such as a road 41 for extension of a large pipe through the pilot bore, it can be used in pipe bursting operation, as described above. Once the diameter of the cable 8 is chosen to handle a specific work load, a corresponding, proportionally-designed spring-operated wedge 2 is selected, which has a bore diameter slightly larger than the diameter of the cable 8 and a length of grip sufficient to intermittently engage the cable 8 without substantially damaging the cable 8. For example, it has been found that a spring-operated wedge 2 having a length of 7¾ inches can be used to pull a cable 8 having a diameter of 1¼ inches without damaging the cable 8. However, it was found that a spring-loaded wedge 2 of three inch length severely damaged a cable 8 of 1¼ inch diameter. Moreover, while the cable-pulling apparatus illustrated in FIGS. 16–24 of the drawings has been described in terms of a pair of in-line cable pulling and gripping devices, it will be appreciated that a single cable pulling and gripping device can be provided in the housing 50 or in a similar mount, for application in the same manner as heretofore described with respect to the apparatus set forth in FIGS. 1–15. For example, either of the front cable-pulling member 54 or the rear cable-pulling member 56 can be mounted in the housing 50 as described above and used in connection with the cable 8 as wound on the drum or reel 42, having a winch 46. The cable-pulling and gripping apparatus can then be operated as heretofore described to pull a load, using the winch 46 to tension the cable 8 as it is pulled from the reel 42.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. Apparatus for pulling a cable attached to a workload, comprising a spring-operated wedge comprising an adaptor having a tapered bore; an articulating wedge slidably disposed in said tapered bore for engaging the cable, said articulating wedge having a length proportional to the diameter of the cable and said articulating wedge capable of positioning in a first position in said tapered bore wherein said articulating wedge grips the cable and a second position in said tapered bore wherein said articulating wedge releases the cable; a coil spring disposed in said adaptor and biasing said articulating wedge in said first position; and a cable pulling mechanism engaging said adaptor for intermittently applying pressure on said adaptor and causing said articulating wedge to grip the cable and pull the workload responsive to movement of said adaptor in a first direction and causing said articulating wedge to release the cable responsive to movement of said adaptor in a second direction.

2. The apparatus of claim 1 wherein said articulating wedge comprises at least three wedge segments and at least one retainer bar engaging said articulating wedge for selectively pivoting at least one of said at least three wedge segments with respect to the others of said at least three wedge segments on said at least one retainer bar.

3. The apparatus of claim 1 wherein said cable-pulling mechanism comprises a carriage adapted to engage said adaptor and at least one fluid-operating piston mechanism operably attached to said carriage for selectively shifting said adaptor forwardly and rearwardly to intermittently grip and release said articulating wedge with the cable and pull the cable and the workload.

4. The apparatus of claim 3 wherein said wedge comprises at least three wedge segments and at least one retainer bar engaging said wedge for selectively pivoting at least one of said at least three wedge segments with respect to the others of said at least three wedge segments on said at least one retainer bar.

5. Apparatus for use with a cable pulling mechanism for pulling a cable underground, said apparatus comprising a spring-loaded wedge comprising an adaptor for engaging the cable pulling mechanism, said adaptor having two ends and a tapered bore; an articulating wedge slidably disposed in said tapered bore between a first position for gripping the cable and a second position for substantially releasing the cable, said articulating wedge having a length proportional to the diameter of the cable; a first coupling provided in one of said two ends of said adaptor; a coil spring disposed in said first coupling, said coil spring biasing said articulating wedge in said first position; and a second coupling engaging the other of said two ends of said adaptor, wherein the cable pulling mechanism selectively intermittently pulls said adaptor for pulling said cable underground as the cable is intermittently gripped and released by said articulating wedge.

6. The apparatus of claim 5 comprising internal coupling threads provided on said first coupling and external adaptor threads provided on said one of said two ends of said adaptor and wherein said internal coupling threads engage said external adaptor threads for removably securing said first coupling on said adaptor and selectively tensioning said coil spring against said articulating wedge.

7. The apparatus of claim 5 comprising external coupling threads provided on said second coupling and internal adaptor threads provided on said other of said two ends of said adaptor and wherein said external coupling threads engage said internal adaptor threads for removably securing said second coupling on said adaptor.

8. The apparatus of claim 5 comprising:
 (a.) internal coupling threads provided on said first coupling and external adaptor threads provided on said one of said two ends of said adaptor and wherein said internal coupling threads engage said external adaptor threads for removably securing said first coupling on said adaptor and selectively tensioning said coil spring against said articulating wedge; and
 (b.) external coupling threads provided on said second coupling and internal adaptor threads provided on said other of said two ends of said adaptor and wherein said external coupling threads engage said internal adaptor threads for removably securing said second coupling on said adaptor.

9. The apparatus of claim 5 wherein said articulating wedge comprises at least two wedge segments and at least one retainer bar pivotally engaging said articulating wedge for selectively pivoting at least one of said at least two wedge segments with respect to the other of said at least two wedge segments on said retainer bar.

10. The apparatus of claim 9 comprising:
 (a.) internal coupling threads provided on said first coupling and external adaptor threads provided on said one of said two ends of said adaptor and wherein said internal coupling threads engage said external adaptor threads for removably securing said first coupling on said adaptor and selectively tensioning said coil spring against said articulating wedge; and
 (b.) external coupling threads provided on said second coupling and internal adaptor threads provided on said other of said two ends of said adaptor and wherein said external coupling threads engage said internal adaptor threads for removably securing said second coupling on said adaptor.

11. An apparatus for pulling cable and a workload attached to the cable, comprising a spring-loaded wedge comprising an adaptor having two ends; a first coupling attached to one end of said adaptor; a second coupling attached to the other end of said adaptor; a tapered bore provided in said adaptor; an articulating wedge having at least two wedge segments slidably disposed in said tapered bore of said adaptor, said at least two wedge segments each having a length proportional to the diameter of the cable, for engaging the cable; a spring disposed in said first coupling for intermittently biasing said at least two wedge segments in a cable-gripping configuration in said tapered bore of said adaptor; and a cable pulling apparatus engaging said adaptor for intermittently applying tension to said adaptor, wherein said at least two wedge segments slide into said cable-gripping configuration in said tapered bore of said adaptor and pull the cable and the workload when said cable pulling apparatus moves said adaptor in a first direction, and said at least two wedge segments slide into a cable-releasing configuration in said tapered bore of said adaptor when said cable pulling apparatus moves said adaptor in a second direction.

12. An apparatus for pulling a workload, comprising a cable for connection to the workload, a pair of cable-pulling members disposed in linearly-aligned relationship with respect to each other on said cable in a slip-fit and a pair of cable gripping elements provided on said pair of cable-pulling members, respectively, said cable-gripping elements disposed in in-line relationship with respect to each other on said cable, for alternately gripping, pulling and releasing said cable and said cable-gripping elements each comprising a spring-operated wedge comprising an adaptor carried by said cable-pulling members, respectively, said adaptor having a tapered bore; an articulating wedge slidably disposed in said tapered bore and teeth provided on said articulating wedge for engaging the cable, said articulating wedge capable of positioning in a first position in said tapered bore wherein said articulating wedge grips the cable and a second position in said tapered bore wherein said articulating wedge releases the cable; a coil spring disposed in said adaptor and biasing said articulating wedge in said first position, said cable-pulling members operating for intermittently applying pressure on said adaptor and causing said articulating wedge to grip the cable and pull the workload responsive to movement of said adaptor in a first direction and causing said articulating wedge to release the cable responsive to movement of said adaptor in the second direction.

13. The apparatus of claim 12 comprising a frame for receiving said pair of cable-pulling members and said pair of cable-gripping elements and wherein said pair of cable-pulling members each comprises a hydraulic cylinder carried by said frame and a piston slidably disposed in said hydraulic cylinder and connected to a corresponding one of said, adaptor for alternately gripping, pulling and releasing said cable.

14. A cable pulling device for engaging a cable attached to a pipe bursting head and pulling the pipe bursting head against a pipe to facilitate bursting and replacing the pipe, said cable-pulling device comprising a frame; a pair of cable-pulling members carried by said frame in linearly-aligned relationship with respect to each other, said cable-pulling members disposed in a slip-fit on the cable; a pair of cable-gripping elements disposed on the cable and connected to said pair of cable-pulling members, respectively, said cable-gripping elements each comprising an adaptor having a tapered bore; a tapered, articulating wedge having internal teeth and slidably disposed in said bore; and a spring engaging said tapered, articulating wedge and biasing said teeth of said tapered, articulating wedge into contact with said cable, for alternately gripping, pulling and releasing the cable, whereby the pipe bursting head progressively cuts and bursts the pipe along the length of pipe as said pair of cable-gripping elements alternately grip and release the cable and said pair of cable-gripping members pull the cable and the cable pulls the pipe bursting head against the pipe.

15. The cable-pulling device in claim 14 wherein said pair of cable-pulling members each comprises a hydraulic cylinder having an interior fluid chamber carried by said frame and a piston slidably disposed in said fluid chamber of said hydraulic cylinder, and wherein said piston is connected to a corresponding one of said adaptor for alternately gripping and releasing the cable.

16. The cable-pulling device of claim 15 comprising a front hydraulic fluid port provided in fluid communication with said fluid chamber at one end of said hydraulic cylinder and a rear hydraulic fluid port provided in fluid communication with said fluid chamber at the other end of said hydraulic cylinder for facilitating a flow of pressurized hydraulic fluid into and out of said fluid chamber and movement of said piston in a selected direction in said fluid chamber.

17. The cable-pulling device of claim 15 wherein said cable-gripping element includes a male coupling carried by said piston, said adaptor engaging said male coupling and a pipe coupling engaging said adaptor and seating said spring against said tapered, articulating wedge and wherein said tapered articulating wedge is slidably disposed in said adaptor.

18. The cable-pulling device of claim 17 comprising front hydraulic fluid port provided in fluid communication with said fluid chamber at one end of said hydraulic cylinder and a rear hydraulic fluid port provided in fluid communication with said fluid chamber at the other end of said hydraulic cylinder for facilitating a flow of pressurized hydraulic fluid into and out of said fluid chamber and movement of said piston in a selected direction in said fluid chamber.

* * * * *